United States Patent

Tanaka

[19]

[11] Patent Number: 5,950,016
[45] Date of Patent: Sep. 7, 1999

[54] RECYCLABLE CAMERA AND FILM COMBINATION FOR A CAMERA RECYCLING SYSTEM

[75] Inventor: Masahide Tanaka, Osaka, Japan

[73] Assignee: Samsung Aerospace Industries, Ltd., Kyeongsangnam-do, Rep. of Korea

[21] Appl. No.: 09/044,015

[22] Filed: Mar. 19, 1998

[30] Foreign Application Priority Data

Jun. 25, 1997 [KR] Rep. of Korea ................ 97-27105

[51] Int. Cl.⁶ .................................................. G03B 17/24
[52] U.S. Cl. ........................ 396/6; 396/71; 396/73; 396/376
[58] Field of Search .................... 396/6, 538, 71, 396/73, 376

[56] References Cited

U.S. PATENT DOCUMENTS

| | | | |
|---|---|---|---|
| 4,593,983 | 6/1986 | Launie et al. | 396/284 |
| 5,021,811 | 6/1991 | Maurinus et al. | 396/6 |
| 5,534,962 | 7/1996 | Zander | 396/6 |
| 5,541,686 | 7/1996 | Stephenson | 396/71 |
| 5,659,828 | 8/1997 | Shimizu et al. | 396/388 |
| 5,708,856 | 1/1998 | Cloutier | 396/6 |

*Primary Examiner*—David M. Gray
*Attorney, Agent, or Firm*—Finnegan, Henderson, Farabow, Garrett & Dunner, L.L.P.

[57] ABSTRACT

A recyclable camera and film combination for a camera recycling system is disclosed. The camera comprises a film cartridge chamber with a lid, a rotatable dial manually rotated in the same, direction flame by frame, for every shot, both in controlling the initial loading of the film and in winding up the film. Also included are means for automatically rewinding the film in response to the rotation of the dial after the last frame in the film has been shot, means for controlling the lid so as to automatically open when the entire film is rewound into the film cartridge, means for counting the number of film cartridges loaded into the cartridge chamber, and means for making the controlling means inoperative, whereby the lid does not open for the removal of the film cartridge loaded in the cartridge chamber when the counting means reaches a predetermined number of film cartridges and thus prevent the cartridge chamber from receiving any further film cartridges.

32 Claims, 6 Drawing Sheets

RECYCLABLE CAMERA AND FILM COMBINATION FOR A CAMERA RECYCLING SYSTEM

BACKGROUND OF THE INVENTION (a) Field of the Invention

The present invention relates to a low cost camera, and more particularly to a recyclable camera and film combination for a camera recycling system.

(b) Description of the Related Art

Generally, conventional "single-use" or "disposable" cameras are well known for their convenience. When consumers forget to bring a camera on sudden trips, for example, single use cameras provide consumers with the flexibility convenience of taking pictures at relatively inexpensive costs.

Because single-use cameras include film inside the camera body, there is no need to buy a film for taking a picture. Conventional single-use cameras consist of a camera body and film, but single-use cameras with built-in flash are also available, thereby making it possible to photograph a subject with a single-use camera day or night.

The single-use camera has several advantages. One advantage is that, considering that the purchase includes both camera and film, single-use cameras make photography possible at relatively low cost. A second advantage of the single-use camera is the camera's ideal easy-loading system which does not require fresh film to be loaded nor is it necessary to remove the exposed film from the camera. A third advantage is the ability to recycle the camera after being used which keeps the cost of the camera down while maintaining quality.

Regardless of all these advantages, however, consumers must still pay for the film as well as the camera, every time they desire to use a conventional single-use camera. This has long been regarded as a disadvantage. Moreover, if a user urgently needs to have the single-use film developed with some unexposed frames left, the user has to abandon not only the remaining unexposed frames of film, but also the camera itself.

In the field of a low cost cameras, there have been other proposals, offering, for example, attachments including a supplementary lens attached in front of an objective lens for changing the focus of the objective lens. Also, recent photographic systems have been developed in which film cartridges, with concealed film leader portions, can be easily loaded by dropping them into a camera, like a battery.

SUMMARY OF THE INVENTION

An object of the present invention is to provide a recyclable camera and film combination for a recycling system, in which the cost the user pays is minimized in view of the film plus the camera.

Another object of the present invention is to provide a recyclable camera and film combination which is more economical than the conventional single-use camera, while incorporating the easy loading system and maintaining the quality of the single-use camera recycling systems.

Still another object of the present invention is to provide a recyclable camera and film combination in which a user can instantly understand how to use it even when the user buys it for the first time.

A further object of the present invention is to provide a recyclable camera and film combination in which a user does not need to abandon the camera if user needs to urgently have the film developed with some unexposed frames left.

Still a further object of the present invention is to provide a recyclable camera and film combination with the advantages of recently developed photographic systems.

To achieve the objects and in accordance with the purpose of the invention, a recyclable camera and film combination for a camera recycling system comprises a receiving means, for receiving a film cartridge to be loaded; a counting means, for counting the number of film cartridges loaded into the receiving means; and a preventing means, for preventing the receiving means from receiving a further film cartridge when the counting means counts to a predetermined number.

To achieve additional objects of the invention, a camera for a recycling system also includes a means for receiving a film cartridge to be loaded; an objective lens; a supplementary lens, normally positioned off an optical axis of the objective lens and shiftable in front of the objective lens, for changing the focus of the objective lens so that it focuses on a face of a user who holds the camera with the objective lens directed towards the user itself; and means for informing a person to be photographed whether the user is within the field angle of the objective lens, wherein the informing means being normally positioned off the objective lens and shiftable close to the objective lens when the supplementary lens is shifted in front of said objective lens.

Other objects and advantages of the present invention will be better understood by reading the following detailed description of the preferred embodiment in conjunction with the attached drawings.

DETAILED DESCRIPTION OF THE PREFERRED EMBODIMENTS

Figure 1:
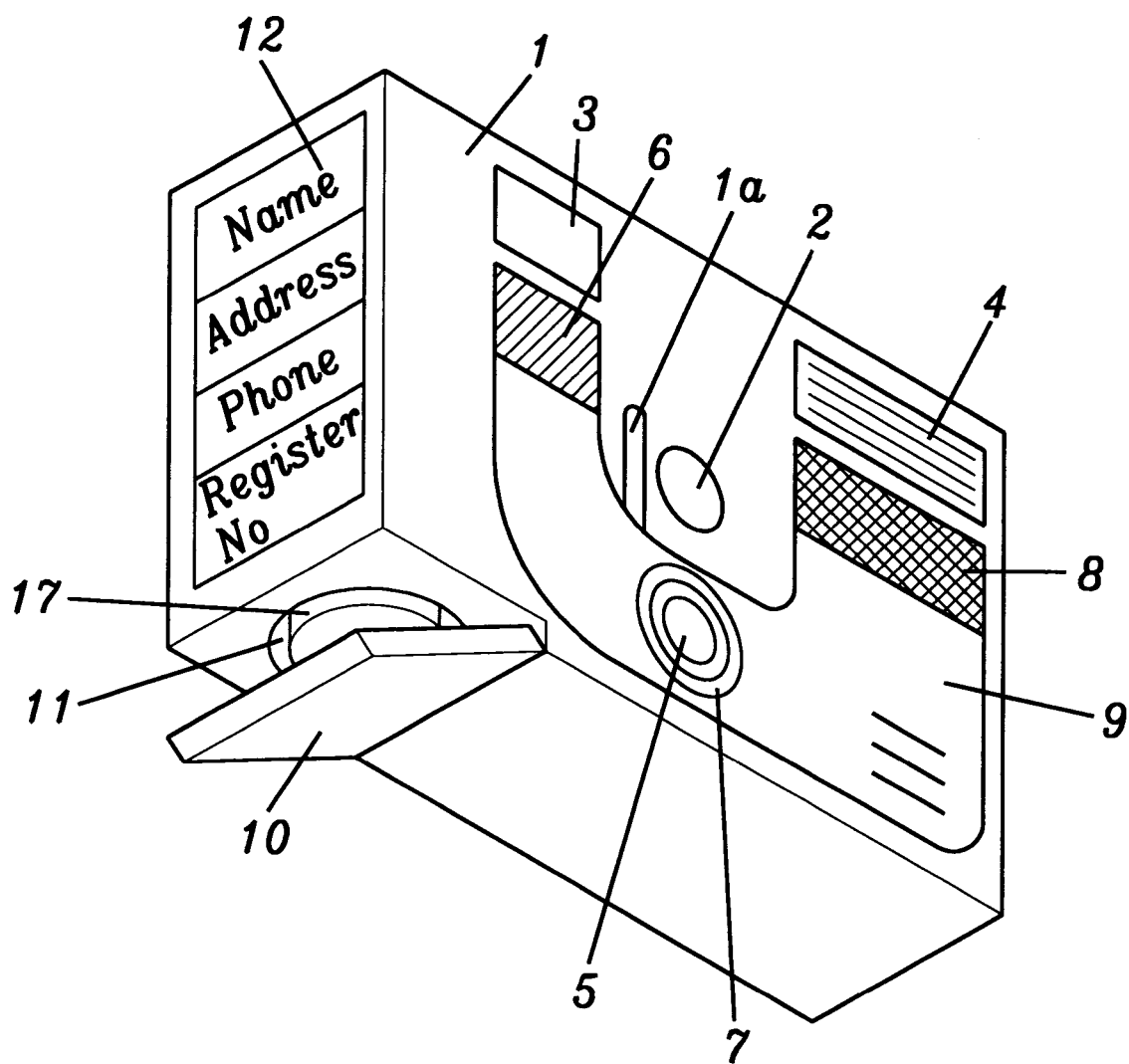
FIG. 1 represents a perspective view of a first preferred embodiment of a camera according to the present invention.
Figure 2:
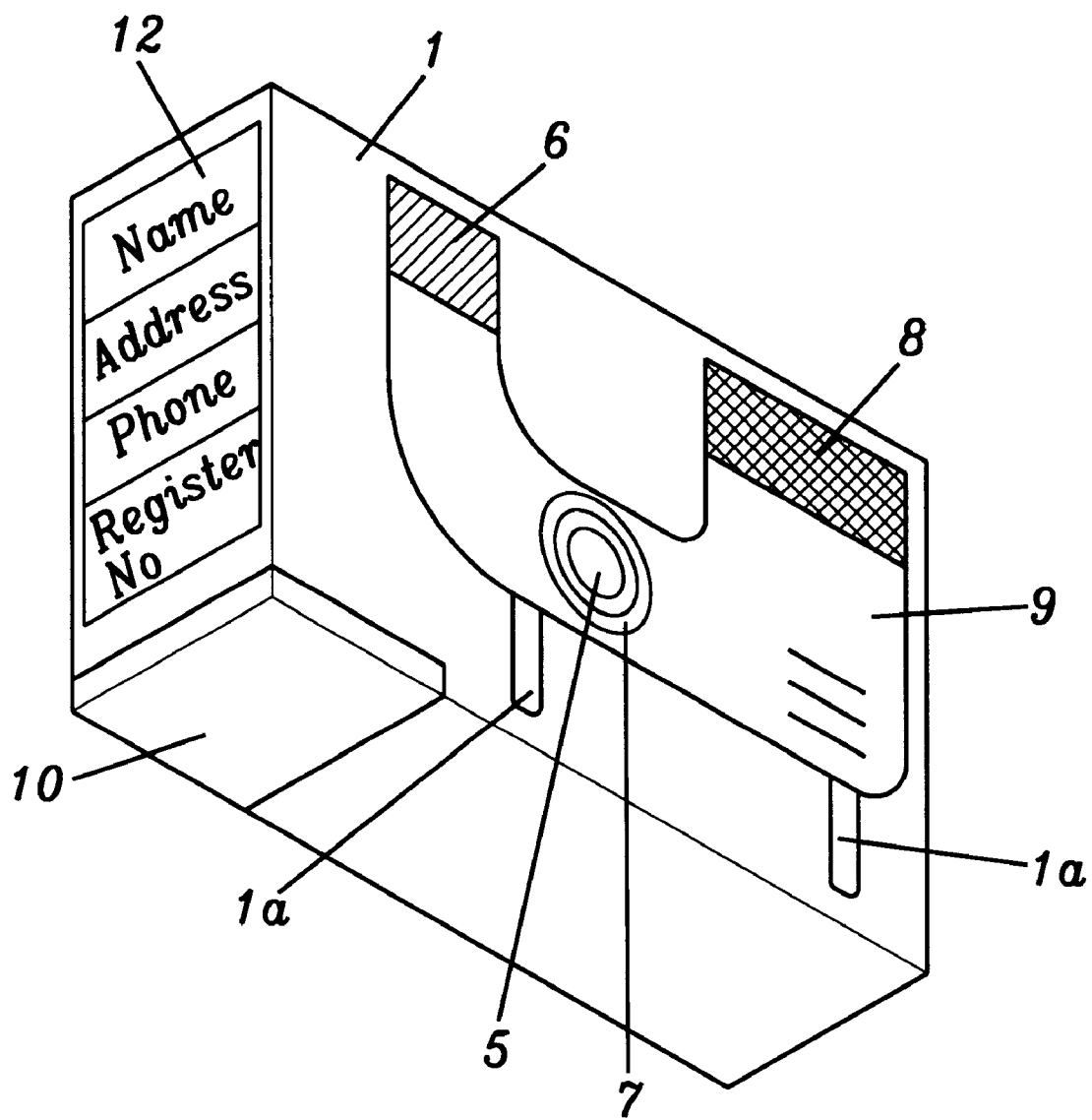
FIG. 2 represents a perspective view of the first preferred embodiment according to the present invention in another operating position.

FIGS. 1 and 2 each represent a perspective view of a first preferred embodiment of a camera according to the present invention in different operating position. The first preferred embodiment exploits the recently developed photographic system in which film is contained within a film cartridge having a light lock door, which remains closed while the film cartridge is outside the camera so that no film leader is observable by a user, the film cartridge being easily loaded by dropping it into the camera like a battery.

In FIG. 1, the camera body 1 comprises an objective lens 2, a finder 3 and a flash 4. A supplementary lens 5 is normally positioned off the optical axis of the objective lens 2 as in FIG. 1, and can shift in front of the objective lens 2 as in FIG. 2 in order to change the focus of the objective lens 2 so that it focuses on the face of the person holding the camera with the objective lens 2 directed to the person itself.

A supplementary lens indicator part 6 is normally positioned off the optical axis of the finder 3 as shown in FIG. 1, and can shift in front of the finder 3 as shown in FIG. 2, in order to indicate that the supplementary lens 5 is shifted in front of the objective lens 2. The indicator part 6 being shifted in front of the finder 3, which is observable through the finder 3, prevents the camera from being misused as a normal picture is taken with the supplementary lens 5 in front of the objective lens 2.

The circle 7 formed around the supplementary lens 5 serves as a field angle indicator for informing a person to be photographed whether they are within the field angle of the objective lens 2. The circle 7 is normally positioned off the objective lens 2 as shown in FIG. 1, and shiftable around the objective lens 2, as in FIG. 2, when the supplementary lens 5 is shifted in front of the objective lens 2. Being able to shift the circle 7 closed to the objective lens 2, allows a person to appear to be looking at the objective lens 2 when they are actually looking at circle 7.

The light defusing part 8 is normally positioned off the flash 4 as shown in FIG. 1, and shiftable in front of the flash 4, as shown in FIG. 2, when the supplementary lens 5 is shifted in front of the objective lens 2 so as to reduce the light from the flash. The ability to shift the light defusing part 8 in front of the flash 4 is beneficial in situations when a person, close to the camera, holds the camera with the objective lens 2 directed at himself.

The supplementary lens 5, the supplementary lens indicator part 6, the field angle indicator or circle 7 and the light defusing part 8 are formed on one shiftable plate 9, thereby permitting the simultaneous shift of all four elements. The shiftable plate 9 is capable of being manually driven along the guide slots 1a.

The lid 10 is opened, as shown in FIG. 1, when the film cartridge 17 is inserted into or removed from the cartridge chamber 11 which receives the film cartridge 17. The lid 10 remains closed when the film cartridge 17 is completely received by the cartridge chamber 11 as shown in FIG. 2.

The camera body 1 further comprises, on its surface, a removable card 12 for identifying the user whose camera is being recycled. The user is identified by various data such as name, age, sex, address, phone number of the user, and a serial registration number. In the process of a recycling system, to be described later, the card 12 is removed from the camera body 1 and sent to a computer data base control center for input. The data base is primarily utilized as marketing information and alternatively used as user service information for issuing coupons of an advanced camera to the user, which may increase the motivation of a user to cooperate in the recycling system.

Figure 3:
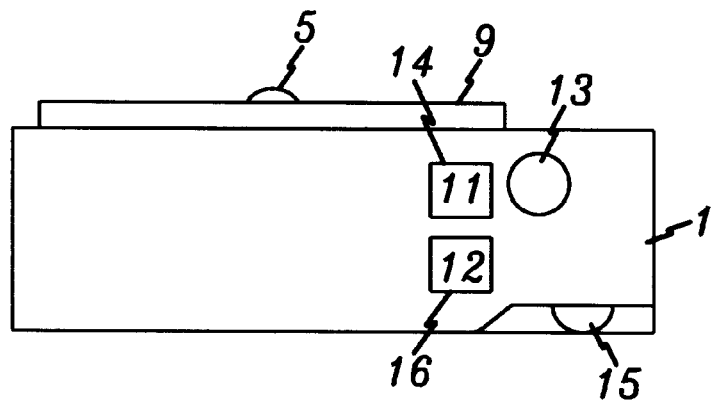
FIG. 3 represents a plane view of the first preferred embodiment according to the present invention.

FIG. 3 represents a top plane view of the first preferred embodiment showing the top portion of the camera body 1, in which the shiftable plate 9 with the supplementary lens 5 are depicted. The top of the camera body 1, comprises a shutter release button 13, a film-frame counter window 14, a dial 15, and a cartridge counter window 16 of which a detailed explanation will be given later.

Figure 4:
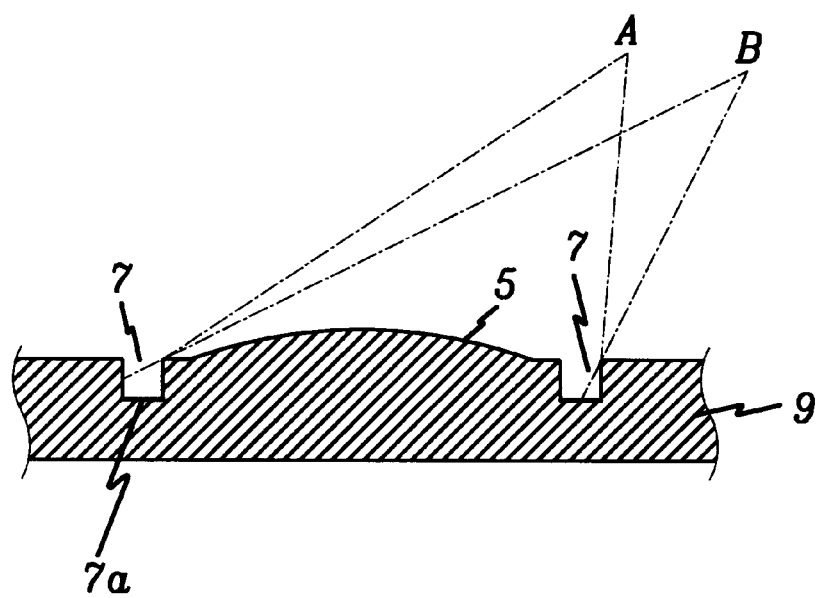
FIG. 4 represents a cross sectional view of a part of the first preferred embodiment according to the present invention.

FIG. 4 represents a cross sectional view of a part of the shiftable plate 9 of the first preferred embodiment of the present invention. The bottom 7a of the circle 7 around the supplementary lens 5 is colored for making it easy for a person looking for the circle 7 to identify it. For example, a person standing at position A looking at the circle 7 can observe a complete colored circular image from the bottom 7a. However, another person standing at position B looking at the circle 7 can not observe a complete colored circular image from the bottom of 7a. The limiting position where a complete colored image from the bottom 7a can be observed corresponds to the limit of the field angle of the objective lens 2. Thus, a person looking at the circle 7 around the supplementary lens 5 can discern whether they are within the field angle of the objective lens 2 by seeing the complete colored circular image on the bottom 7a at the circle 7. A person can, therefore, move into a position in which a complete colored circular image can be viewed from the bottom 7a, thus ensuring that a good photograph will be taken.

Figure 5:
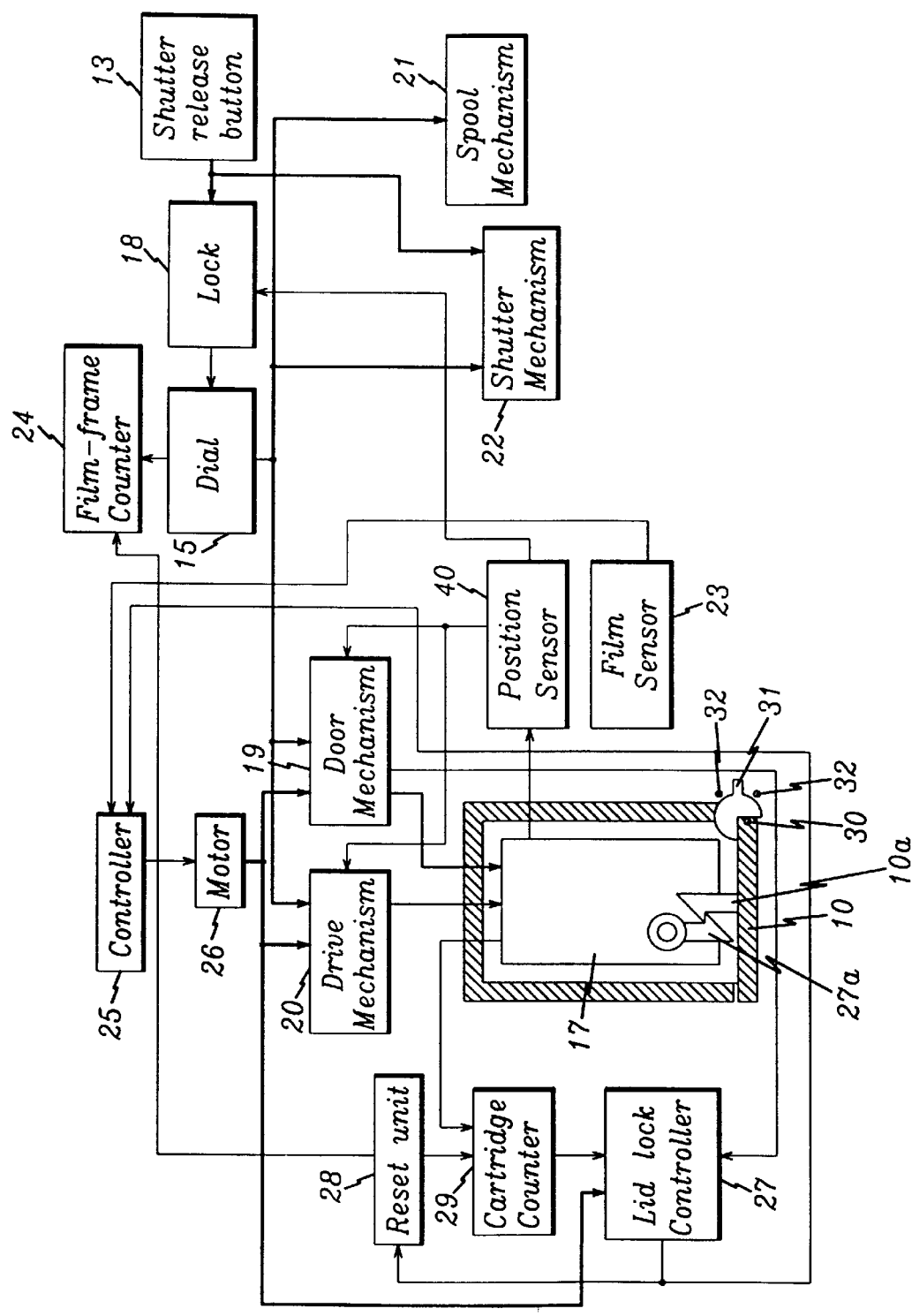
FIG. 5 represents a block diagram of a system of the first preferred embodiment according to the present invention.

FIG. 5 represents a block diagram of a system of the first preferred embodiment according to the present invention. The thick lines represent the transmission of mechanical power, while the thin lines represent the relationship of various controls. When the camera is sold, the first film cartridge 17 has been already loaded in the cartridge chamber 11 with the lid 10 closed as shown in FIG. 5. The first thing that a user has to do with the camera is to manually wind up the film by rotating the dial 15, the lock 18 having been initially released for allowing the manual rotation of the dial 15 to occur. The door mechanism 19 drives the light lock door of the film cartridge 17 to open the lid 10. The drive mechanism 20 then drives the shaft of the film cartridge 17 to thrust the film leader portion out of the light lock. In response to the manual rotation of the dial 15, the spool mechanism 21 is engaged. The drive mechanism 20 is, thus, rendered inoperative when the film leader portion reaches the spool mechanism 21, so that the film is only advanced by the spool mechanism 21 pulling the film. The manual rotation of the dial 15 in this stage further causes the shutter mechanism 22 to be operated. When the film sensor 23 senses that the first flame of the film is suitably positioned at the exposure aperture of the camera, the lock 18 functions to prevent further rotation of the dial 15.

The above described functions occur in sequence by manually rotating the dial 15. Therefore, the camera is ready for the first shot simply by rotating the dial 15 in the same direction until further rotation is prevented.

The first shot is possible by depressing the shutter release button 13, which also releases the lock 18 thus permitting the dial 15 to be rotated again for winding an exposed film. For the second and successive shots, the dial 15 is manually rotated for winding up the film, frame by frame, for every shot. This is also similar to a general single-use camera. The necessary function is achieved by the spool mechanism 21 and the shutter mechanism 22 which respond to the rotation of the dial 15, and also by the lock 18 responsive to the film sensor 23 which prevents further rotation of the dial 15. The rotation of the dial 15 further controls the film-frame counter 24, which indicates the number of a frame through the film-frame counter window 14 as shown in FIG. 3.

As described above, dial 15 is further capable of controlling the initial loading of the film by the same means of manipulating the dial 15 as in the manual, frame by frame, winding operation of the film for every shot. In other words, the dial 15 is manually rotated in the same direction for controlling the initial loading of the film and for winding up the film.

When the film sensor 23 senses that, following the shot of the last frame in the film, the film is wound to a predetermined position, the lock 18 functions to prevent further rotation of the dial 15 and the film sensor 23 informs the controller 25 to activate the motor 26 for automatically starting the rewinding of the film. The motor 26 rotates the drive mechanism 20 in the opposite direction of that of the dial 15.

After the film sensor 23 senses that the film is completely rewound into the film cartridge 17, the position sensor 40 senses a predetermined rotational position of the shaft of the film cartridge 17 for stopping the rotation of the shaft by the drive mechanism 20, for switching the power of the motor 26 to the door mechanism 19, and for closing the light lock door and fixing the rotational position of the shaft of the film cartridge 17.

The door mechanism 19 informs the lid lock controller 27 of the completion of closure of the light lock door to switch the power of the motor 26 to the lid lock controller 27 for releasing the latch 27a from the hook 10a of the lid 10. The lid 10 is, therefore, automatically open when the entirety of the film is rewound into the film cartridge 17. In response to the lid lock controller 27 releasing the latch 27a from the hook 10a, the reset unit 28 resets the film-frame counter 24 and the controller 25 makes the motor 26 stop.

Furthermore, the cartridge counter 29 increases its number in response to the function of the reset unit 28 with the film cartridge 17 present in the cartridge chamber 11. The number counted by the cartridge counter 29 is indicated through the cartridge counter window 16 as shown in FIG. 3. The cartridge counter 29 makes the lid lock controller 27 inoperative to respond to the door mechanism 19 when the count reaches a predetermined number, such as "five". As such, the lid 10 does not open for the removal of the fifth film cartridge 17 loaded in the cartridge chamber 11 when the cartridge counter 29 counts the predetermined number, "five" to prevent the cartridge chamber 11 from receiving the sixth film cartridge 17.

The lid 10 is rotatable about pin 30, on which the holder 31 is coaxially supported. There is suitable friction provided between the lid 10 and the holder 31. The holder 31 is biased with a spring, not shown in FIG. 5, in the counterclockwise direction and its rotation is restricted by a pair of stopper pins 32. Thus, when the latch is released by the lid lock controller 27, the holder 31 biases the lid 10 in the counterclockwise direction.

Figure 6:
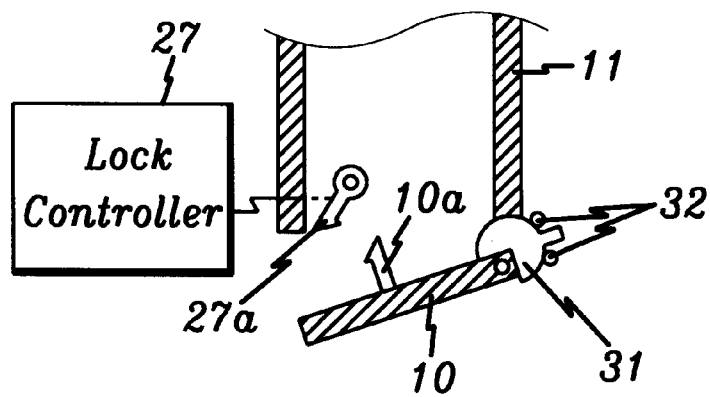
FIG. 6 represents a part of the block diagram of the system of the first preferred embodiment according to the present invention in another operating position.
Figure 7:
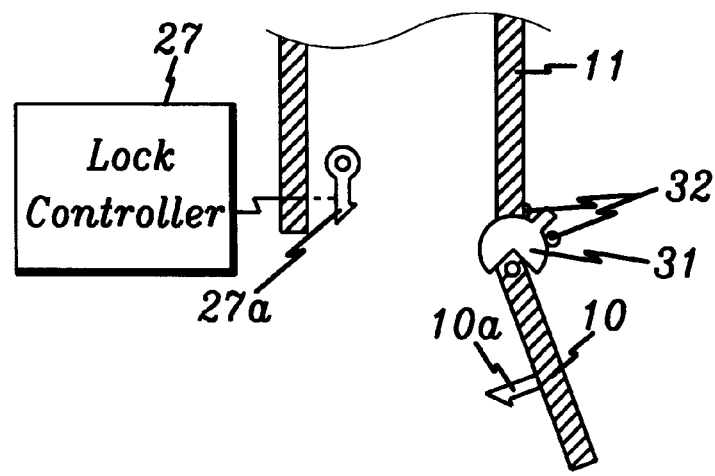
FIG. 7 represents the part of the block diagram of the first preferred embodiment according to the present invention in still another position operating.

So, if the lid lock controller 27 releases the latch 27a from the hook 10a, the lid 10 rotates in the counterclockwise direction according to the bias of the holder 31 to the position as shown in FIG. 6 and stops by the friction between the stopper pins 32. The condition in FIG. 6 corresponds to that shown in FIG. 1. The lid 10 is further manually rotatable against the friction till the stopper pins 32 reaches the position as shown in FIG. 7 for removing the used film cartridge 17 and inserting a new one. When closing, the lid 10 is manually rotated in the clockwise direction from the position as shown in FIG. 7 to the position as shown in FIG. 5.

In summary, use of the first preferred embodiment of the present invention is similar to a conventional single-use camera over a first portion of the use cycle, that is, from buying it to taking the last shot of the first film cartridge. Furthermore, the first preferred embodiment automatically provides the naturally expected rotation of the dial 15 after the last shot causes the rewinding of the film and the half opening of the lid 10 in succession. So a user of the first preferred embodiment of the present invention, seeing the condition in FIG. 1, will instantly understand what to do next even in the case that the user buys it for the first time. For example, the user will open the lid 10, as shown in FIG. 7, without failing to replace the film cartridge 17 (i.e., similar to replacing a battery). Also, if the lid 10 is closed again with the film cartridge replaced, the status of the camera is quite identical with the condition when it was initially bought. Taking pictures and replacing film cartridges are repeated till a predetermined number of film cartridges, i.e. "five", are exhausted. In this case, only the film cartridge 17 needs to be brought to the laboratory for developing and printing. For the last film cartridge, however, the lid 10 does not open even if the dial 15 is further rotated after the last shot. In this case, the user is to bring the camera itself to the laboratory for developing and printing of the film in the camera as in a general single-use camera.

Accordingly, use of the first preferred embodiment according to the present invention is similar to use of a conventional single-use camera except that the film cartridge is capable of being reloaded for a predetermined number of times, e.g. reload film cartridge five times. According to the first preferred embodiment, the cost of a combination of one camera and five film cartridges is less expensive than that of single-use cameras. The manner of film reloading is self-evident by means of utilizing the best of the recently developed new photographic system. After the limit of the number of film cartridges permitted to be reloaded is reached, the camera is returned for recycling as in the case of a conventional single-use camera. In doing so, the system decreases the cost of the camera while guaranteeing the quality of the camera. The use of a one-way motor, for only rewinding in the first embodiment, is also advantageous for decreasing the cost of the camera.

Figure 8:
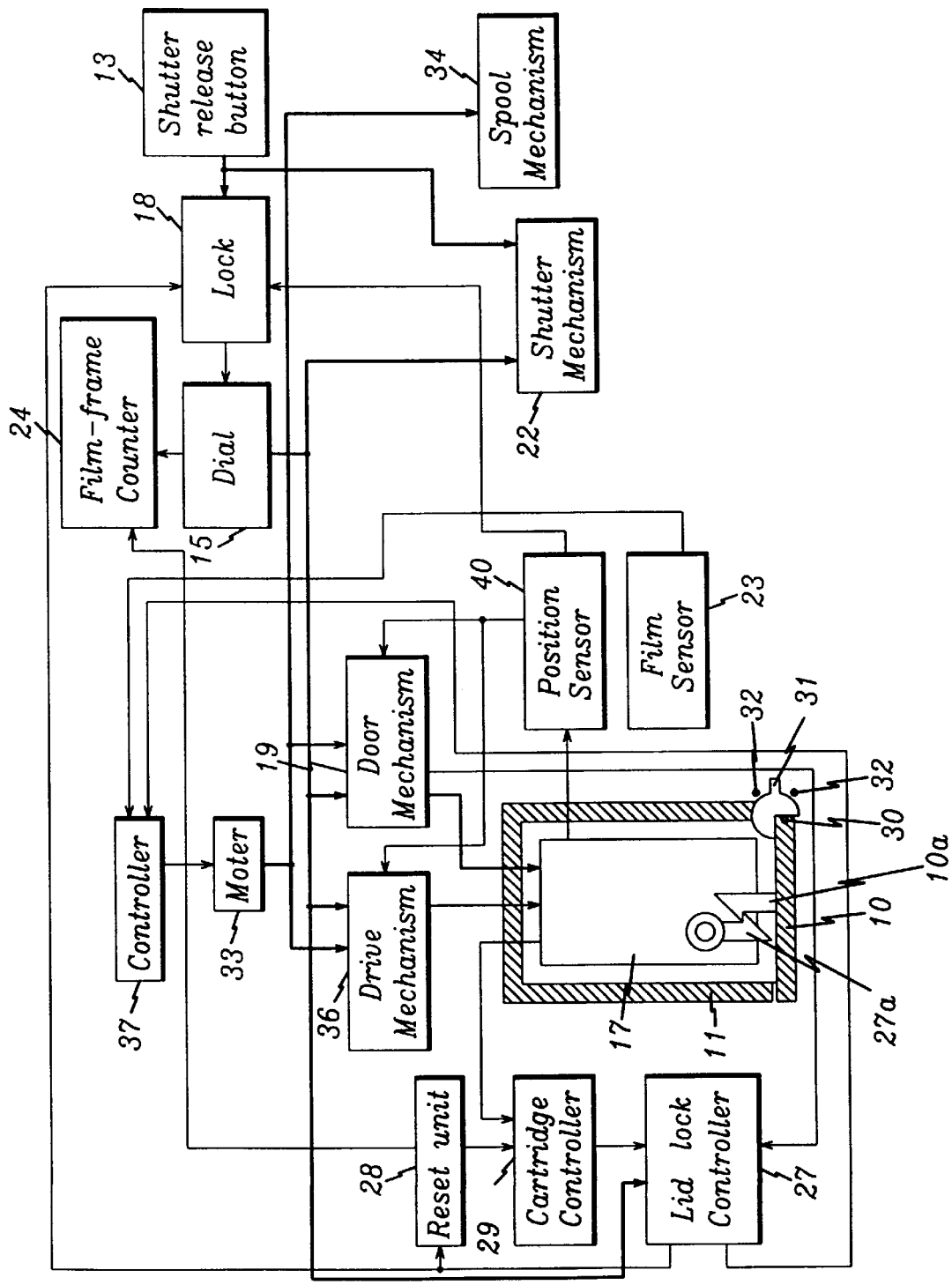
FIG. 8 represents a block diagram of a system of a second preferred embodiment according to the present invention.

FIG. 8 represents a block diagram of a system of a second preferred embodiment according to the present invention, in which the motor 33 is utilized to prewind all the flames of the film to the side of the spool mechanism 34 in advance to the exposure to those frames.

In more detail, when the camera according to the present invention is sold, the first film cartridge 17 has been already loaded in the cartridge chamber 12 with the lid 10 closed, all the frames of the film having been prewound to the side of the spool mechanism 34. The first thing that a user has to do with the camera is to manually rotate the dial 15, the lock 18 having been initially released for allowing this operation. In response to the rotation of the dial 15, the drive mechanism 33 pulls back the film into the film cartridge 17. The manual rotation of the dial 15 further causes the shutter mechanism 22 to be operated. When the film sensor 23 senses that the first frame of the film is suitably positioned at the exposure aperture of the camera, the lock 18 functions to prevent further rotation of the dial 15. This is similar to a general single-use camera.

The first shot is made possible by depressing the shutter release button 13, which also releases the lock 18 for allowing the dial 15 to be rotated again. For the second shot and so on, much like the general single-use camera, the dial 15 is manually operated for winding back the film into film cartridge, flame by frame, for every shot. The drive mechanism 36, shutter mechanism 22 responsive to the rotation of the dial 15, and the lock 18 responsive to the film sensor 23, all function to prevent further rotation of the dial 15. The rotation of the dial 15 further controls the film-frame counter 24, which indicates the number of a frame through the film-frame counter window 14 as shown in FIG. 3.

When the film sensor 23 senses that the film is completely wound back to the film cartridge 17 following the shot of the last flame in the film, the position sensor 40 functions to sense a predetermined rotational position of the shaft of the film cartridge 17 for stopping the rotation of the shaft by the drive mechanism 36 and switching the power of the dial 15 to the door mechanism 19 for closing the light lock door and fixing the rotational position of the shaft of the film cartridge 17.

The door mechanism 19 informs the lid lock controller 27 of the completion of closure of the light lock door to switch the power of the dial 15 to the lid lock controller 27 for releasing the latch 27a from the hook 10a of the lid 10. In other words, the lid 10 is automatically open when the entire of film is wound into the film cartridge 17. In response to the lid lock controller 27 releasing the latch 27a from the hook 10a, the reset unit 28 resets the film-frame counter 24 and the lock 18 functions to prevent further rotation of the dial 35.

Further, the cartridge counter 29 increases the number of cartridges counted by one in response to the function of the reset unit 28 with the film cartridge 17 present in the cartridge chamber 11. The number counted by the cartridge counter 29 is indicated through the cartridge counter window 16 shown in FIG. 3. The cartridge counter 29 makes the lid lock controller 27 inoperative to respond to the door mechanism 19 when the count reaches a predetermined number, such as "five". In other words, the lid 10 does not open for the removal of the fifth film cartridge 17 loaded in the cartridge chamber 11 when the cartridge counter 29 counts the predetermined number, the "five" to prevent the cartridge chamber 11 from receiving the sixth film cartridge 17.

When the film cartridge 17 is replaced and the lid 10 is closed, the controller 37 in response thereto has the motor 33 rotate, whereby the prewinding automatically starts response to the closure of the lid 10. In response to the initial stage of the rotation of the motor 33, the door mechanism 19 functions to drive the light lock door of the film cartridge 17 to open, and then the drive mechanism 36 functions to drive the shaft of the film cartridge 17 to thrust the film leader portion out of the light lock. In response to the rotation of the motor 33, the spool mechanism 34 also starts to function. The drive mechanism 36 is made inoperative when the film leader portion reaches the spool mechanism 34 and the film prewinding is made possible only by means of the spool mechanism 34 pulling the film.

When the film sensor 23 senses that the film is prewound to a predetermined position, the controller 37 in response thereto has the motor 33 stop. In this condition, the status of the camera is quite identical to the condition when it was initially bought.

The above function serves as a means for automatically prewinding the entirety of the film out of the film cartridge 17 in response to the completion of the loading of the film cartridge 17 into the cartridge chamber 11.

In the second preferred embodiment, operations and functions of taking a picture, loading, and removing a film cartridge etc. are similar to those of the first embodiment and will be easily understood in view of the explanation of the first embodiment.

While the present preferred embodiment of the invention has been disclosed and described, it will be obvious to those skilled in the art that various changes and modifications can be readily made therein, without departing from the scope and spirit of the invention as defined by the appended claims.

What is claimed is:

1. A recyclable camera and film combination for a camera recycling system comprising:
   receiving means for receiving a film cartridge to be loaded;
   counting means for counting the number of film cartridges loaded into the receiving means; and
   preventing means for preventing the receiving means from receiving a further film cartridge when the number of film cartridges loaded reaches a predetermined number, as determined by the counting means.

2. The recyclable camera and film combination of claim 1, wherein the preventing means comprises controlling means for controlling the receiving means to preclude the removal of a film cartridge loaded in the receiving means.

3. The recyclable camera and film combination of claim 2, wherein the receiving means comprises a lid operable between an open position, when a film cartridge is inserted into or removed from the receiving means, and a closed position, when a film cartridge is completely received by the receiving means, and wherein the controlling means comprises locking means for locking the lid when the counting means counts a predetermined number.

4. The recyclable camera and film combination of claim 1, wherein the receiving means further comprises
   a lid operable between an open position, when a film cartridge is inserted into or removed from the receiving means, and a closed position, when a film cartridge is completely received by the receiving means; and
   controlling means for automatically opening the lid when the film is completely rewound into the film cartridge, wherein the preventing means comprises control releasing means for rendering the controlling means inoperative, and means for preventing the lid from opening for the removal of the loaded film cartridge or for the loading of a further film cartridge in the receiving means when the number of film cartridges loaded reaches a predetermined number, as determined by the counting means.

5. The recyclable camera and film combination of claim 4, wherein the controlling means further comprises means for biasing the lid toward its opening direction, means for locking the lid at its closing position, and lock release means for releasing the locking means so that the lid opens automatically in response to the biasing means unless the lock release means is made inoperative by the control releasing means so that the lid remains in the closed position.

6. The recyclable camera and film combination of claim 1, further comprising manual winding means for manually winding up the film, frame by frame, for every shot.

7. The recyclable camera and film combination of claim 6, wherein the manual winding means comprises means for controlling the initial loading of the film by manually winding up the film, frame by flame, for every shot.

8. The recyclable camera and film combination of claim 7, wherein the manual winding means comprises a rotatable dial, manually rotated in the same direction for controlling the initial loading of the film and for winding up the film, frame by frame, for every shot.

9. The recyclable camera and film combination of claim 8, further comprising automatic rewinding means for automatically rewinding the film into the film cartridge in response to the manual rotation of the rotatable dial after the last frame in the film has been shot.

10. The recyclable camera and film combination of claim 9, wherein the receiving means comprises a lid to be opened, when a film cartridge is inserted into or removed from the receiving means, and to be closed, when a film cartridge completely received by the receiving means, and means for controlling the lid so as to automatically open when the film is completely rewound into the film cartridges, and wherein the preventing means comprises control releasing means for rendering the controlling means inoperative, and means for preventing the lid from opening for the removal of the loaded film cartridge or for the loading of a further film cartridge in the receiving means when the number of film cartridges loaded reaches a predetermined number, as determined by the counting means.

11. The recyclable camera and film combination of claim 6, further comprising means for automatically prewinding the entire film out of the film cartridge in response to the completion of the loading of the film cartridge into the receiving means.

12. The recyclable camera and film combination of claim 11, wherein the receiving means comprises a lid operable between an open position, when a film cartridge is inserted into or removed from the receiving means, and a closed position, when a film cartridge is completely received by the receiving means, wherein the prewinding means automatically starts operating in response to the closure of the lid.

13. The recyclable camera and film combination of claim 12, wherein the manual winding means comprises a rotatable dial, manually rotated for moving the film back to the film cartridge frame by frame, for every shot.

14. The recyclable camera and film combination of claim 13, further comprising controlling means for automatically opening the lid when the film is completely rewound into the film cartridge, wherein the preventing means comprises control releasing means for rendering the controlling means inoperative, and means for preventing the lid from opening for the removal of the loaded film cartridge or for the loading of a further film cartridge in the receiving means when the number of film cartridges loaded reaches a predetermined number, as determined by the counting means.

15. The recyclable camera and film combination of claim 14, wherein the controlling means stops the automatic rewinding means, the rewinding means initiated by the manual rotation of the rotatable dial after the last frame of the film has been shot, when the film has been completely rewound into the film cartridge.

16. The recyclable camera and film combination of claim 1, further comprising a film cartridge count indicator for indicating the number of film cartridges in response to the counting means.

17. The recyclable camera and film combination of claim 1, further comprising a removable card on the surface of the camera for identifying a user for a recycling service.

18. The recyclable camera and film combination of claim 1, further comprising an objective lens, a finder, a supplementary lens for changing the focus of the objective lens and capable of shifting to a position in front of the objective lens so that it focuses on a face of a user holding the camera with the objective lens directed back at the user, and a supplementary lens indicator means for indicating that the supplementary lens is positioned in front of the objective lens.

19. The recyclable camera and film combination of claim 18, wherein the supplementary lens is normally positioned off an optical axis of the objective lens.

20. The recyclable camera and film combination of claim 18, wherein the supplementary lens indicator means is normally positioned off an optical axis of the finder and capable of being shifted to a position in front of the finder.

21. The recyclable camera and film combination of claim 18, further comprising a field angle indicator for informing a user to be photographed whether the user is within the field angle of the objective lens, the field angle indicator being normally positioned off the objective lens and capable of shifting to a position adjacent to the objective lens when the supplementary lens is shifted in front of the objective lens.

22. The recyclable camera and film combination of claim 21, further comprising a flash and a diffuser for reducing light, the diffuser being normally positioned off the flash and capable of shifting to a position in front of the flash when the supplementary lens is shifted in front of the objective lens.

23. The recyclable camera and film combination of claim 22, comprising a shiftable plate supporting the supplementary lens, the supplementary lens indicator means, the field angle indicator, and the diffuser so they can shift altogether, and wherein the field angle indicator is located to surround the supplementary lens.

24. The recyclable camera and film combination of claim 23, wherein the field angle indicator further comprises a colored circular image surrounding the supplementary lens.

25. A recyclable camera and film combination comprising:
   receiving means for receiving a film cartridge to be loaded;
   an objective lens;
   a supplementary lens for changing the focus of the objective lens and capable of shifting to a position in front of the objective lens so that it focuses on a face of a user holding the camera with the objective lens directed back at the user;
   a supplementary lens indicator means for indicating that the supplementary lens is positioned in front of the objective lens.

26. The recyclable camera and film combination of claim 25, further comprising a field angle indicator for informing a user to be photographed whether the user is within the field angle of an objective lens, the field angle indicator being normally positioned off the objective lens and capable of shifting to a position adjacent to the objective lens when a supplementary lens is shifted in front of the objective lens.

27. The recyclable camera and film combination of claim 26, further comprising a flash and a diffuser for reducing light, the diffuser being normally positioned off the flash and capable of shifting to a position in front of the flash when the supplementary lens is shifted in front of the objective lens.

28. The recyclable camera and film combination of claim 27, comprising a shiftable plate supporting the supplementary lens, the supplementary lens indicator means, the field angle indicator, and the diffuser so they can shift altogether, and wherein the field angle indicator is located to surround the supplementary lens.

29. A recyclable camera and film combination comprising:
   receiving means for receiving a film cartridge to be loaded;
   an objective lens;
   a supplementary lens for changing the focus of the objective lens and capable of shifting to a position in front of the objective lens so that it focuses on a face of a user holding the camera with the objective lens directed back at the user; and
   a field angle indicator for informing a user to be photographed whether the user is within the field angle of the objective lens, the field angle indicator being normally positioned off the objective lens and capable of shifting to a position adjacent to the objective lens when the supplementary lens is shifted in front of the objective lens.

30. The recyclable camera and film combination of claim 29, wherein the field angle indicator further comprises a colored circular image surrounding the supplementary lens.

31. The recyclable camera and film combination of claim 29, wherein the field angle indicator is located to surround the supplementary lens.

32. The recyclable camera and film combination of claim 29, comprising a shiftable plate supporting the supplementary lens and the field angle indicator so they can shift altogether.

* * * * *